United States Patent
Hertle et al.

(10) Patent No.: US 11,065,172 B2
(45) Date of Patent: Jul. 20, 2021

(54) CUSHIONING BODY FOR A LEG REST OF A ROLLATOR WALKING AID

(71) Applicant: Orthoscoot GmbH, Neusäß/Vogelsang (DE)

(72) Inventors: Andreas Hertle, Aystetten (DE); Frank Heinrich, Augsburg (DE)

(73) Assignee: Orthoscoot GmbH, Neusäss/Vogelsang (DE)

( * ) Notice: Subject to any disclaimer, the term of this patent is extended or adjusted under 35 U.S.C. 154(b) by 27 days.

(21) Appl. No.: 16/504,855

(22) Filed: Jul. 8, 2019

(65) Prior Publication Data

US 2020/0016023 A1 Jan. 16, 2020

(30) Foreign Application Priority Data

Jul. 10, 2018 (DE) ...................... 10 2018 116 612.5

(51) Int. Cl.
*A61H 3/04* (2006.01)
*A61H 3/00* (2006.01)

(52) U.S. Cl.
CPC .......... *A61H 3/04* (2013.01); *A61H 2003/005* (2013.01); *A61H 2205/104* (2013.01)

(58) Field of Classification Search
CPC ................ A61H 3/04; A61H 2003/005; A61H 2205/104
See application file for complete search history.

(56) References Cited

U.S. PATENT DOCUMENTS

| 2,448,427 A | 8/1948 | Gordon |
| 5,839,740 A | 11/1998 | Seeger |
| 7,114,188 B1 | 10/2006 | Teigen |
| 8,348,288 B1 | 1/2013 | Laughon, Sr. |
| 8,608,184 B2 | 12/2013 | Janis et al. |
| 8,915,517 B1 | 12/2014 | Jacobs et al. |

(Continued)

FOREIGN PATENT DOCUMENTS

| CA | 2464902 A1 | 10/2004 |
| CA | 2820031 C | 1/2017 |

(Continued)

OTHER PUBLICATIONS

Search result of examination report of German Application No. 10 2018 116 612.5 filed Jul. 10, 2018.

(Continued)

*Primary Examiner* — Bryan A Evans

(74) *Attorney, Agent, or Firm* — Paul D. Bianco; Gary S. Winer; Fleit Intellectual Property Law

(57) ABSTRACT

A cushioning body for a leg rest of a rollator walking aid is in the form of an elastic molded body and has an upper side, which, when the elastic molded body is attached to a support member of the leg rest of the walking aid and the walking aid is used by a person, faces a bent leg of the person, a lower side, and a depression disposed on the upper and/or lower side. The depression is configured as a recess or as an area in which the material of the molded body has a reduced density. In the depression, a protuberant part of the anterior surface of the knee and of the neighboring portion of the lower leg is received when a leg of a person is resting on the cushioning body, in particular when the bent leg is in contact with the upper side of the cushioning body.

20 Claims, 3 Drawing Sheets

(56) References Cited

U.S. PATENT DOCUMENTS

| | | | |
|---|---|---|---|
| 9,271,892 B1 | 3/2016 | Bement | |
| 9,962,312 B2 | 5/2018 | Heinrich et al. | |
| 2004/0217565 A1 | 11/2004 | Ramm | |
| 2006/0230538 A1 | 10/2006 | Brown | |
| 2008/0230103 A1 | 9/2008 | Olexenko | |
| 2008/0284125 A1* | 11/2008 | Ramm | B62K 3/002 280/263 |
| 2009/0058036 A1* | 3/2009 | Hoepner | A61H 3/04 280/267 |
| 2009/0058037 A1* | 3/2009 | Accetta | A61H 3/04 280/267 |
| 2012/0280467 A1* | 11/2012 | Walther | G06Q 30/0641 280/263 |
| 2013/0075997 A1* | 3/2013 | Mailahn | A61H 3/04 280/263 |
| 2017/0165146 A1* | 6/2017 | Franson | B62K 5/08 |

FOREIGN PATENT DOCUMENTS

| | | |
|---|---|---|
| CN | 106 945 770 A | 7/2017 |
| DE | 10160416 A1 | 6/2003 |
| DE | 20 2015 106 424 U1 | 3/2017 |
| EP | 3173059 A1 | 5/2017 |
| WO | 95/25022 A1 | 9/1995 |
| WO | 2008/018114 A1 | 2/2008 |

OTHER PUBLICATIONS

European Search Report for EP 3593783, dated Oct. 8, 2019 (related application).

* cited by examiner

CUSHIONING BODY FOR A LEG REST OF A ROLLATOR WALKING AID

FIELD OF THE DISCLOSURE

The disclosure relates to a cushioning body for a leg rest of a rollator walking aid.

BACKGROUND

Rollator walking aids serve to enable a person with a leg or foot injury to be ambulatory without putting stress on the injured leg or foot in order to prevent such stress from interfering with the healing process. Using a walking aid for locomotion is similar to using a scooter, with the injured leg or the leg with the injured foot being positioned at an angle relative to the knee or the lower leg on an approximately horizontal elongated rest in order to relieve the stress on the injury so that the walking aid instead of the injured leg or foot supports the weight of the body when stress is put on the injured leg or the leg with the injured foot. EP 3 173 059 A1 discloses such a walking aid, which allows the tilt of the leg rest to be adjusted about an axis that is oriented transverse to the direction of travel.

In this reference, the leg rest is essentially trough-shaped, the cross section of which is approximately semicircular, which trough has a longitudinal axis and open long ends and is composed of a hard shell and an elastic cushioning body which is detachably attached to the upper side of the shell. Because of the trough shape of the leg rest, the leg of the user of the walking aid resting on said leg rest is centered in the middle of the leg rest in the direction of travel of the walking aid. On contact with the leg, the cushioning body, on the upper side of which the leg of the user is directly positioned, yields elastically and conforms to the surface shape of the leg. Because the cushion is detachably attached to the shell, for example, by means of a hook-and-loop-type fastener, it is possible to replace the cushion when needed.

SUMMARY

Using the above-identified reference as the starting point, one aspect of the disclosure relates to a cushioning body for a leg rest of a rollator walking aid, which cushioning body offers greater comfort to the user of the walking aid.

Advantageous embodiments and further advanced modifications are also disclosed.

According to the present disclosure, a cushioning body for a leg rest of a rollator walking aid consists of an elastic molded body which is intended to be attached to a support member of the leg rest of the walking aid and which has an upper side which, when attached and the walking aid is used by a person, faces a bent leg of the person and is in contact with said bent leg, which upper side of the cushioning body has a depression which, on contact of the upper side with a bent leg of a person, is able to receive protuberant parts of the anterior surface of the human knee and of the neighboring portion of the lower leg.

As an alternative or in addition thereto, it is also possible to provide a depression in the lower side of the cushioning body opposite the upper side thereof, in which case, because of the depression in the lower side, the leg of the person, more particularly the knee, sinks in and is thereby received therein when it rests on the upper side of the cushioning body, without high pressure being exerted on the knee.

The depression in the upper side and/or the lower side can be configured either as a recess or as an area in which the material of the molded body has a reduced density. In either case, when a leg of a person is resting on the cushioning body, in particular when the bent leg is in contact with the upper side of the cushioning body, a protuberant part of the anterior surface of the knee and of the neighboring portion of the lower leg is received in the depression, as a result of which the counterpressure generated on the knee is reduced.

This configuration prevents the formation of pressure peaks on the anterior surface of said parts of the body in that a hollow space or at least a softer area is created in the cushioning body for protuberant parts of the body, which hollow space or softer area can receive the protuberant parts of the leg, especially those of the knee. When a walking aid having a leg rest with a cushioning body, the upper side of which does not conform to the anatomy, is used over a prolonged period of time, it is possible for pressure peaks to develop, which lead to pressure pain. Contouring the cushioning body as disclosed by the present disclosure therefore makes the use of a rollator walking aid fitted with such a cushioning body more comfortable.

The depression should, in particular, be able to receive the protuberances formed by the patella and the tibial tuberosity on the anterior surface of the bent leg of a person and thereby reduce the pressure exerted on these protuberances when the cushioning body is in contact with the bent leg of the person.

The shape of the depression is preferably symmetrical relative to a plane of symmetry which extends at right angles relative to the surface of the upper side of the cushioning body. As a result, the shape of the depression conforms to the shape of the protuberant parts of the anterior surface of the human knee and of the neighboring portion of the lower leg, with the shape of these protuberant parts also being approximately symmetrical.

The upper side of the cushioning body along its entire length is preferably trough-shaped, and the depression is formed on the concave side of the trough. Because of this trough shape, the lower leg of the user of a walking aid resting on the upper side of the cushioning body is laterally centered beyond the protuberant parts as well.

The cushioning body, when attached to the support member of the walking aid, preferably has a longitudinal direction which conforms to the direction of travel of the walking aid, and the depression extends in the longitudinal direction from a starting point on the upper side of the cushioning body up to one of the ends thereof where the edge of the depression is formed by the edge of the cushioning body. Thus, this creates sufficient room for receiving the kneecap (patella) which forms one of the protuberant parts, the distance of which kneecap of a bent knee from a protuberant part of the lower leg depends on the body height of an individual.

The depression preferably has a shape in which, when viewing the upper side of the cushioning body in a downward direction from above, the lateral edge of the depression has the shape of one of the letters U or V or of a symmetrical parabola with a vertex, with the open side of the letter U or V or of the parabola being located on the end of the cushioning body, to which end the depression extends. Other shapes of the depression are conceivable and, if required, can be individually adapted to the individual anatomical characteristics of a patient, for example, by mapping the shape of the leg, in particular of the knee, by means of a scanner and by conforming the shape of the cushioning body to the shape measured to produce a customized product so that an optimum fit in the depression can be achieved for the leg part, especially for the knee, which rests on the upper side of the cushioning body when the walking aid is used.

In an embodiment having a different, particularly advantageous shape of the depression, when viewing the upper side of the cushioning body in a downward direction from above, the depression, proceeding from a starting point on the upper side on which it starts, initially widens continuously in the lateral direction as the distance in the longitudinal direction from this point increases, subsequently becomes continuously narrower and then again continuously widens up to the end of the cushioning body. When viewing its upper side in a downward direction from above, this shape of the depression can have a first substantially almond-shaped portion and a second substantially V-shaped portion, which portions sufficiently overlap in the longitudinal direction to form an overlapping portion so that a coherent depression is formed, with the open side of the V-shaped portion being located on the end of the cushioning body. In this case, the first portion of the depression is intended to receive the tibial tuberosity, and the second portion is intended to receive the patella, thereby ensuring optimum conformity of the shape and location of the depression in the longitudinal and transverse direction of the upper side of the cushioning body with the anatomical characteristics of a leg which is bent at the knee joint.

With respect to the depth profile, the depth of the depression is preferably greatest in the area of the plane of symmetry and continuously decreases to the edge of the depression, as the distance from the plane of symmetry increases. In addition, in a cut plane formed through the plane of symmetry, the depression preferably has two deeper portions and a flatter portion therebetween, with a first deeper portion proceeding from a starting point on the upper side of the cushioning body, from which starting point the depth initially increases continuously, and with the second deeper portion extending to the edge of the cushioning body. Initially, proceeding from the flatter portion, the depth of the second deeper portion preferably increases continuously and subsequently remains approximately constant up to the edge of the cushioning body. A depth profile of the depression configured in this manner ensures optimum conformity with the anatomical characteristics of a leg which is bent at the knee joint.

BRIEF DESCRIPTION OF THE DRAWINGS

A practical example of the present disclosure will be described below with reference to the drawings. These drawings show FIG. 1 a lateral view of a rollator walking aid, FIG. 2 a perspective view of a cushioning body according to the present disclosure for the leg rest of the walking aid shown in FIG. 1, FIG. 3 a rear view of the cushioning body shown in FIG. 2, FIG. 4 a view of a longitudinal section through the cushioning body of FIG. 2, FIG. 5 a top view of the cushioning body shown in FIG. 2, and FIG. 6 top views of two different embodiments of a cushioning body according to the present disclosure.

DETAILED DESCRIPTION

Figure 1:
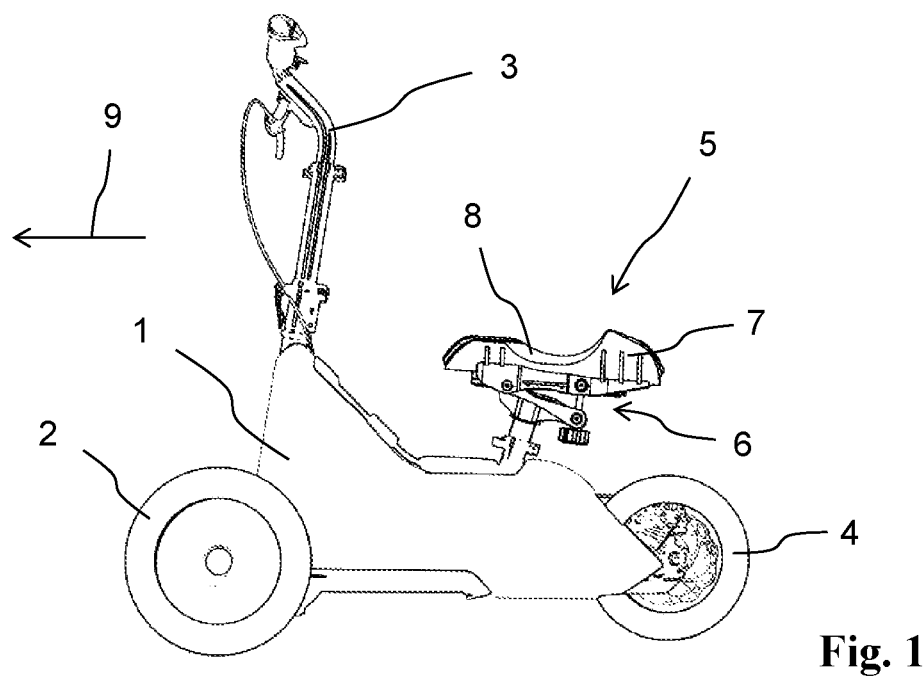

FIG. 1 shows a lateral view of a rollator walking aid. The main components of the walking aid shown in FIG. 1 are a frame 1, one of two front wheels 2, a handle bar 3 for steering the front wheels 2, a rear wheel 4 and a leg rest 5 for the knee and the lower leg of a leg of a person whose mobility is to be improved by means of the walking aid. The leg rest 5 is connected to the frame 1 via an adjustment mechanism 6 for adjusting the tilt of the leg rest in the direction of travel. It comprises a support member 7 and a cushioning body 8 which is attached to the upper side of the support member 7 facing the leg of the user. In FIG. 1, the direction of travel of the walking aid is identified by an arrow 9.

Figure 2:
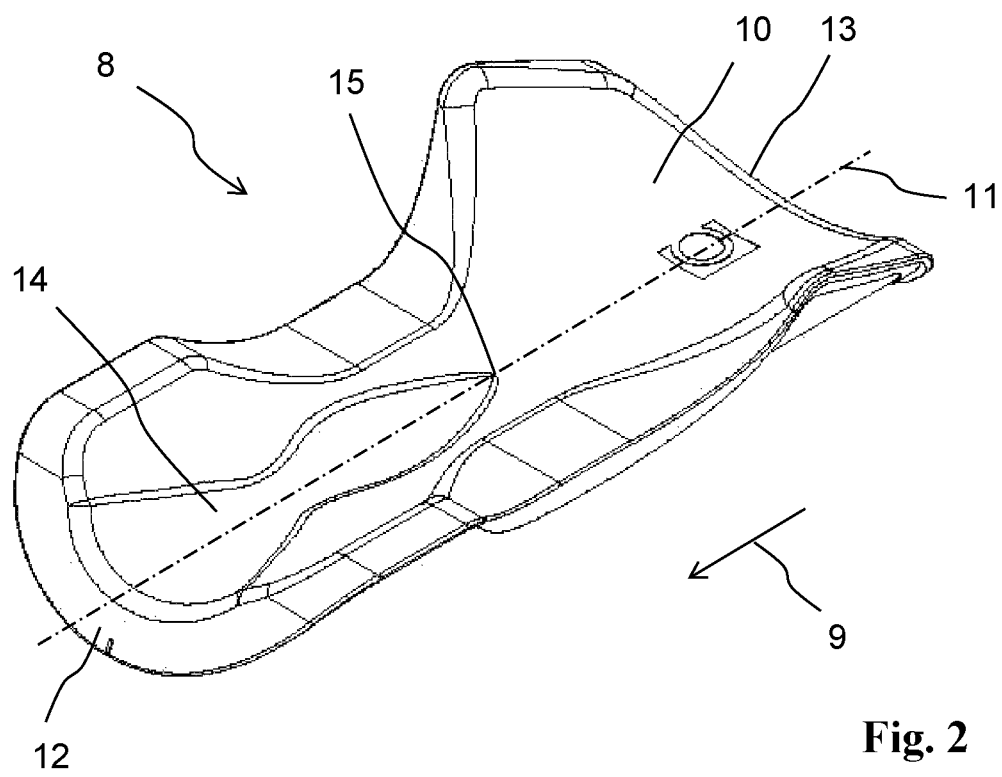

FIG. 2 shows an enlarged perspective view of a cushioning body 8 according to the present disclosure. The direction, which, after attachment of the cushioning body 8 to a rollator walking aid, is the direction of travel of the walking aid, is identified by an arrow 9 in FIG. 2 as well. As FIG. 2 indicates, the cushioning body 8 is substantially trough-shaped with two open ends. When the cushioning body 8 is used on a rollator walking aid, the cushioning body 8 is positioned in a support member 7 which is also trough-shaped and to which it is preferably attached by means of one or a plurality of hook-and-loop-type fasteners, the components of which are disposed on the upper side of the support member 7 and on the lower side of the cushioning body 8. As an alternative to hook-and-loop-type fasteners, it is also possible to use other types of detachable attachment devices, such as press studs, snap hooks or magnetic tapes and combinations of different types of detachable attachment devices.

The cushioning body 8 consists of an elastic molded body made of a plastic material, the surface of which can be coated with an impervious and washable coating, or it can be covered by a removable sleeve which has the aforementioned properties. The elasticity of the molded body is calculated for the average weight of an individual so that during the use of a walking aid, the molded body will be slightly deformed by the part of the leg of the user resting thereon.

In FIG. 2, the cushioning body 8 has a plane of symmetry, the intersection of which with the surface of the upper side 10 of the cushioning body is identified by the dash-dotted line of symmetry 11. The direction of the line of symmetry 11 is the longitudinal direction of the cushioning body 8 in which the cushioning body has a markedly greater extension than at right angles to this direction. When the cushioning body 8 is attached to a horizontally oriented support member 7 of a walking aid, the direction of the line of symmetry 11 coincides with the direction of travel 9 of the walking aid. At right angles relative to this direction, the upper side 10 of the cushioning body 8 has a concave curvature, which, along its entire length, results in a trough shape in which the user's knee and lower part of the leg rests, and to which the walking aid fitted with the cushioning body 8 is intended to provide relief when in use. Thus, the knee of the leg is resting on the cushioning body 8 near the front end 12 of this cushioning body, while the lower end of the lower leg is projecting beyond the rearward end 13 of the cushioning body 8 so that in this area, the foot of the user is located beyond the cushioning body 8.

As FIG. 2 indicates, the upper side 10 of the cushioning body 8 has a depression 14 which extends from a starting point 15 located at a halfway point along the cushioning body 8 all the way to the front end 12 of the cushioning body 8 and which has a symmetrical shape, with respect to the plane of symmetry in which the line of symmetry 11 is located. The depression 14 conforms to the anatomical shape of the anterior surface of the human knee and of the neighboring portion of the lower leg, i.e., it is well suited to receive existing protuberances in form of the kneecap (patella) and a tuberosity (tibial tuberosity) on the upper end portion of the shinbone.

If the shape of the trough on the upper side 10 of the cushioning body 8 were uniform without having the depression 14 provided between the starting point 15 of the depression 14 and the rearward end 13 of the cushioning body 8, the bony protuberances would be subjected to the greatest pressure upon contact of the leg with the cushioning body 8 during use of a walking aid fitted with the cushioning body 8. Due to the fact that said protuberances can project into the depression 14, the pressure is more uniformly distributed across the anterior surface of the leg, which improves comfort for the user of the walking aid and prevents the development of pressure pain on said bony protuberances when said walking aid is used over a prolonged period of time.

Figure 3:
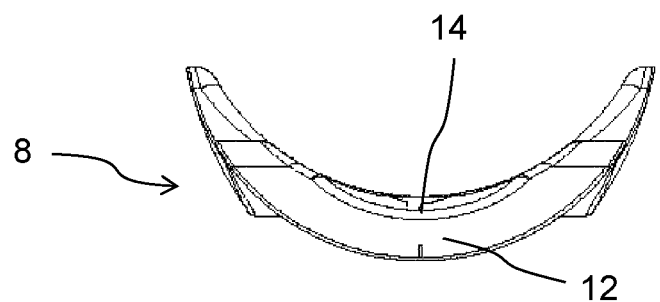

FIG. 3 shows a front view of the cushioning body 8 in a viewing direction facing the front end 12 of the cushioning body parallel to the line of symmetry 11. As this figure illustrates, the depth of the depression 14 increases continuously from the lateral edge of the depression toward the center, i.e., in the view of FIG. 3, the base of the depression has a concave curvature. It is also readily recognizable in FIG. 3 that the cushioning body 8, along its entire cross section, has the shape of a trough that is open on both ends. Because of this shape and the lateral symmetry of the depression 14, the protuberances on the anterior surface of the human knee and of the neighboring portion of the lower leg projecting into the depression 14 are centered in the lateral direction, i.e., at right angles relative to the plane of symmetry in which the line of symmetry 11 is located, on the upper side 10 of the cushioning body 8, which has an additional centering effect on the entire leg that is to be supported.

Figure 4:
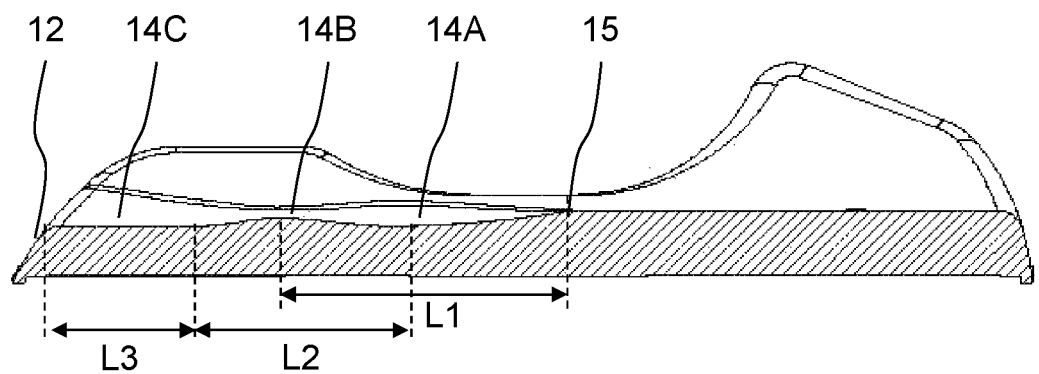

As the view of the longitudinal section through the cushioning body along the line of symmetry 11 in FIG. 4 shows, the depth of the depression 14 varies in the longitudinal direction of the cushioning body 8. From the starting point 15 of the depression 14 which, in the longitudinal direction of the cushioning body 8, is located approximately at a halfway point along the cushioning body, a first portion 14A, in which the depth initially increases continuously in the direction of the front end 12 and subsequently decreases, is followed by a flatter second portion 14B in which the depth initially decreases continuously and subsequently again increases, and this second portion is finally followed by a third portion 14C in which the depth again increases continuously and subsequently remains constant over the major part of that portion up to the front end 12 of the cushioning body 8.

This depth profile in the longitudinal direction of the depression 14 takes into account the fact that the two protuberances on the anterior surface of the human knee and of the neighboring portion of the lower leg, which are to be received in the depression 14, are at a certain distance from one another, which creates an area requiring a shallower depth for the reception of that leg portion in the depression 14 than for the reception of each of the two protuberances. The ligament of the kneecap (patellar ligament) is located in this area between the two protuberances, and, although it would seem beneficial to relieve stress on this ligament as well by providing a depression, a shallower depth of the depression 14 suffices.

The depth profile of the depression 14 which is approximately complementary to the shape of the anterior surface of the leg that is to be supported by the cushioning body 8 has the effect that the leg is optimally positioned in the longitudinal direction of the cushioning body 8 in that the two protuberances, if slightly incorrectly positioned in the longitudinal direction, tend to slide into the two deeper portions 14A and 14C, as a result of which the position of the leg relative to the cushioning body 8 is stabilized in the longitudinal direction thereof.

Figure 5:
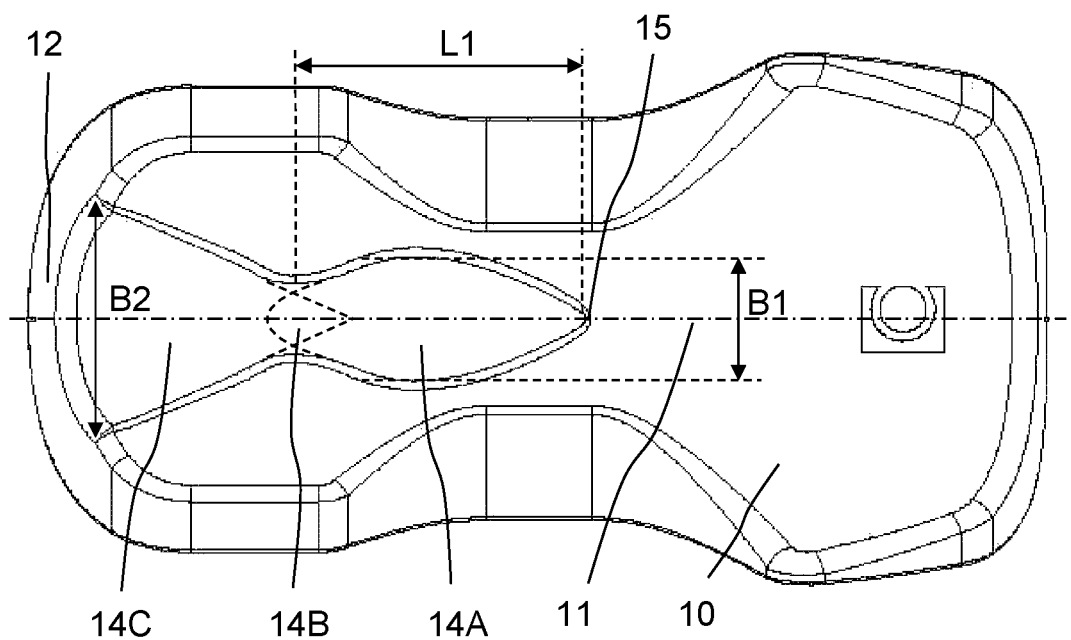

FIG. 5 shows a top view of the cushioning body 8, i.e., in a viewing direction directed at the line of symmetry 11 at right angles relative to the upper side 10 of the cushioning body 8 from above. As this figure indicates, proceeding from the starting point 15 of the depression, which is located approximately at a halfway point along the cushioning body 8, the depression 14 initially widens continuously at right angles relative to the line of symmetry 11, subsequently becomes continuously narrower in this direction, and finally widens continuously again in this direction up to the front end 12 of the cushioning body 8. The shape in the view of FIG. 5 can be approximately construed as the overlap between an almond-shaped inside portion 14A and a V-shaped outside portion 14C, with the closed end of the almond-shaped inside portion 14A at the starting point 15 of the depression 14 being located approximately at a halfway point along the cushioning body 8, and with the open end of the V-shaped outside portion 14C being located on the front end 12 of the cushioning body 8.

In FIG. 5, the edges of the two portions 14A and 14C in the overlapping portion 14B thereof within the depression 14 are identified by broken lines in order to more clearly outline the almond shape and the V-shape of the portions 14A and 14C in combination with the actually existing edge of the depression 14. However, in the area in which the depression 14 laterally narrows, i.e., in portion 14B of the depression, the portions 14A and 14C fluidly merge into each other so that the contours of the edges of the portions 14A and 14C, which in this area are identified by the broken lines, do not actually exist. The portions of the depression 14 designated by 14A, 14B and 14C in FIG. 5 are identical to the portions designated by the same reference characters in FIG. 4. This means that the portions 14A and 14C have a greater depth than the middle portion 14B therebetween in which the depression 14 is laterally narrowed. Thus, the inside portion 14A is intended to receive the tibial tuberosity, and the outside portion 14 C is intended to receive the patella of the leg of a user of a walking aid, which leg is resting on the cushioning body 8.

For the purpose of contouring the depression 14 as disclosed so as to offer greater comfort to as large a group of users as possible, the following dimensions of the individual portions 14A, 14B and 14C of the depression 14 have been found to be useful and/or preferred:

Maximum depth of the inside and outside portions 14A and 14C of the depression: 3-8 mm Minimum depth of the middle portion 14B of the depression: 2-4 mm Width B1 of the inside portion 14A of the depression: 45-60 mm Length L1 of the inside portion 14A of the depression: 80-110 mm Minimum distance L2 of the deepest part between portions 14A and 14C: 50-70 mm Length L3 of the deepest part (part of constant depth) of portion 14C: 40-60 mm Maximum width B2 of portion 14C on its front end 12: 50-80 mm The predominantly constant depth in the longitudinal direction and the V-shape of the outside portion 14C of the depression along the major part of its length serve to take into account the variations in the diameter of the patella and the distance of the patella from the tibial tuberosity between different users. Since it can be assumed that, in general, both the distance of the patella from the tibial tuberosity and the diameter of the patella increase with increasing body height of an individual, centering the tibial tuberosity in the inside portion 14A of the depression will allow the outside portion 14C of the depression in the intended shape to receive the patella within a wide range of distances and diameters so that a large circle of users with different anatomical measurements in the knee region can profit from a reduction of the pressure exerted on these protuberances.

Figure 6:
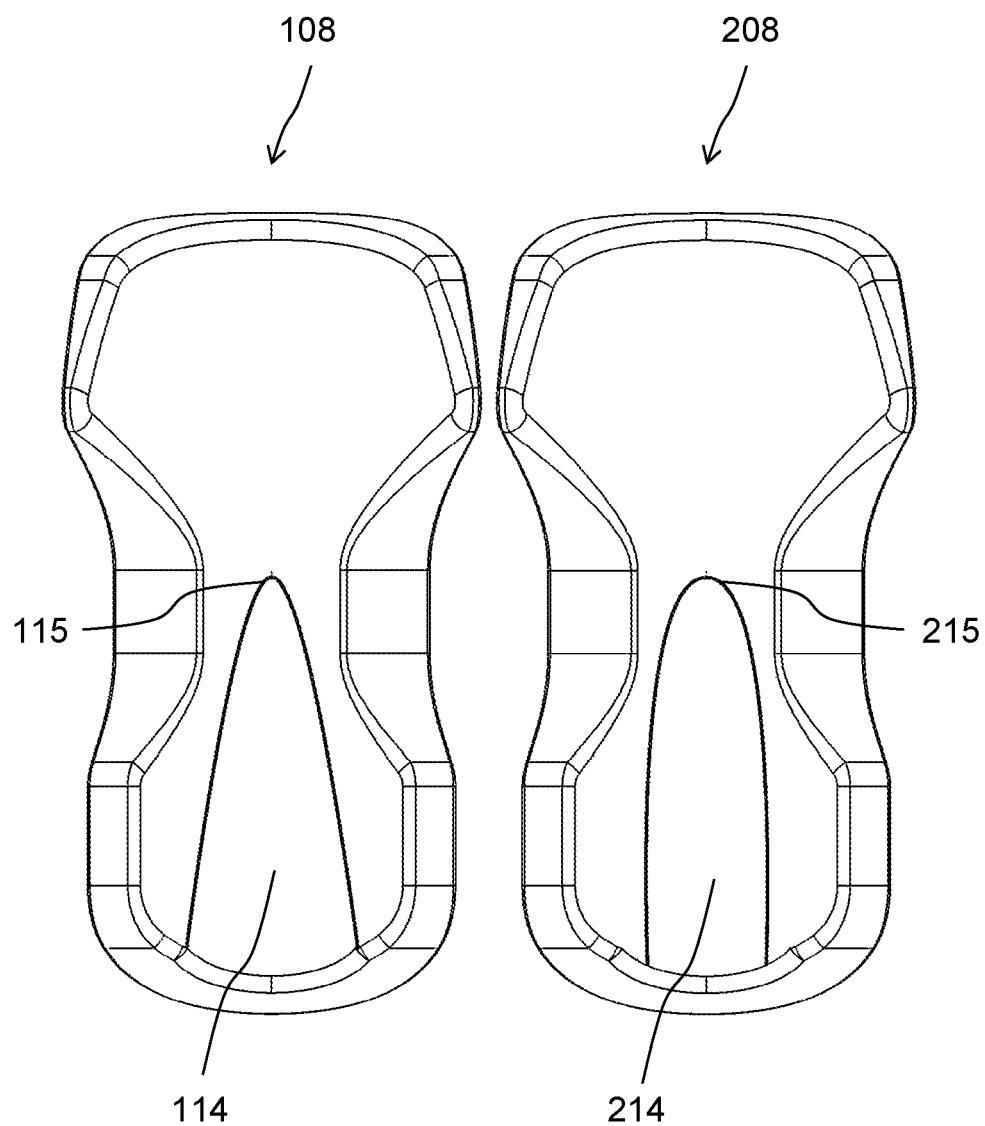

FIG. 6 shows two additional embodiments of a cushioning body 8 according to the present disclosure which are slightly simplified in comparison with the previously described first embodiment. In the cushioning body 108 shown on the left side, the depression 114 along the entire length thereof has the shape of the letter V with a rounded-off tip, and in the cushioning body 208 shown on the right side, the depression 214 along the entire length thereof has the shape of a U. Thus, in these two embodiments, the width of the depression increases continuously from a given starting point 115 or 215, which in this case is again located approximately at a halfway point along the cushioning body 108 or 208, without having a lateral narrower portion.

However, in the simplified embodiments of FIG. 6, the depth profile again conforms to the depth profile of the first embodiment illustrated in FIG. 4. The effect achieved by laterally centering the leg of the user within the inside region of the depression 114 and 214 is slightly less pronounced than in the first embodiment; however, the relevant characteristic features of the present disclosure are implemented in these embodiments as well.

The invention claimed is:

1. A cushioning body for a leg rest of a rollator walking aid, wherein the cushioning body is an elastic molded body attachable to a support member of the leg rest of the walking aid and comprises an upper side and a lower side, with the upper side facing and being in contact with a leg of a person when the person is using the walking aid, wherein the upper side along the entire length thereof is trough-shaped and the depression is formed on a concave side of the trough and wherein at least one of the upper side and the lower side of the cushioning body has a depression, with the depression being configured as a recess or as an area in which material of the molded body has a lower density and with a protuberant part of the anterior surface of the knee and of the neighboring portion of the lower leg being received in the depression when the leg of the person is resting on the cushioning body.

2. The cushioning body of claim 1, wherein the depression receives protuberances formed by the patella and the tibial tuberosity on the anterior surface of a bent leg of a person, thereby reducing pressure exerted on the protuberances by receiving parts of the bent leg of the person in the depression of the cushioning body.

3. The cushioning body of claim 1, wherein a shape of the depression is symmetrical relative to a plane of symmetry extending at right angles relative to a surface of the upper side of the cushioning body.

4. The cushioning body of claim 1, wherein, when attached to the support member of the walking aid, the cushioning body has a longitudinal direction which corresponds to a direction of travel of the walking aid, and wherein the depression extends in the longitudinal direction proceeding from a starting point on the upper side of the cushioning body up to one of ends of the cushioning body where an edge of the depression is formed by an edge of the cushioning.

5. The cushioning body of claim 4, wherein when viewing the upper side of the cushioning body in a downward direction from above, the lateral edge of the depression has a shape of one of the letters U or V or of a symmetrical parabola with a vertex, with the open side of the letter U or V or of the parabola being located on the end of the cushioning body, to which end the depression extends.

6. The cushioning body of claim 4, wherein when viewing the upper side of the cushioning body in a downward direction from above, the depression initially widens continuously in a lateral direction from the starting point on the upper side, on which the depression begins, as the distance in the longitudinal direction from the starting point increases, subsequently becomes continuously narrower, and finally widens continuously again up to the end of the cushioning body.

7. The cushioning body of claim 6, wherein when viewing the upper side of the cushioning body in a downward direction from above, the depression has a first substantially almond-shaped portion and a second substantially V-shaped portion, which first and second portions sufficiently overlap in the longitudinal direction in an overlap portion so that a coherent depression is formed, and wherein an open side of the V-shaped portion is located on the end of the cushioning body.

8. The cushioning body of claim 3, wherein the depth of the depression is greatest in the area of the plane of symmetry and, with increasing distance from the plane of symmetry, decreases continuously up to the edge of the depression.

9. The cushioning body of claim 3, wherein in a cut plane formed through the plane of symmetry, the depression has two deeper portions and a flatter portion therebetween, with a first deeper portion proceeding from a starting point on the upper side of the cushioning body, from which starting point the depth initially increases continuously, and with the second deeper portion extending up to the edge of the cushioning body.

10. The cushioning body of claim 9, wherein starting from the flatter portion, the depth of the second deeper portion initially continuously increases continuously and subsequently remains approximately constant up to the edge of the cushioning body.

11. The cushioning body of claim 9, wherein a maximum depth of the first and of the second deeper portion of the depression each measures 3-8 mm and a minimum depth of the flatter portion of the depression measures 2-4 mm.

12. The cushioning body of claim 9, wherein a length of the first deeper portion of the depression in the longitudinal direction of the cushioning body measures 80-110 mm and a width of the first portion at right angles relative to the longitudinal direction measures 45-60 mm.

13. The cushioning body of claim 9, wherein a minimum distance of the deepest areas between the deeper portions of the depression measures 50-70 mm, a length of the deepest area of the second portion of the depression measures 40-60 mm, and a maximum width of the second deeper portion of the depression on the front end of the cushioning body measures 50-80 mm.

14. A leg rest of a rollator walking aid for use as a support for a leg of a person bent at the knee, comprising a support member, a lower side of which is attachable to a part of a frame of the walking aid, and the cushioning body of claim 1, wherein the cushioning body is attachable to an upper side of the support member and on the upper side of which cushioning body the bent leg of the person using the walking aid is resting.

15. A cushioning body for a leg rest of a rollator walking aid, wherein the cushioning body is an elastic molded body attachable to a support member of the leg rest of the walking aid and comprises an upper side and a lower side, with the upper side facing and being in contact with a leg of a person when the person is using the walking aid, wherein at least one of the upper side and the lower side of the cushioning body has a depression, with the depression being configured as a recess or as an area in which material of the molded body has a lower density and with a protuberant part of the anterior surface of the knee and of the neighboring portion of the lower leg being received in the depression when the leg of the person is resting on the cushioning body, wherein, when attached to the support member of the walking aid, the cushioning body has a longitudinal direction which corresponds to a direction of travel of the walking aid, wherein the depression extends in the longitudinal direction proceeding from a starting point on the upper side of the cushioning body up to one of ends of the cushioning body where an edge of the depression is formed by an edge of the cushioning, and wherein when viewing the upper side of the cushioning body in a downward direction from above, the depression initially widens continuously in a lateral direction from the starting point on the upper side, on which the depression begins, as the distance in the longitudinal direction from the starting point increases, subsequently becomes continuously narrower, and finally widens continuously again up to the end of the cushioning body.

16. The cushioning body of claim 15, wherein when viewing the upper side of the cushioning body in a downward direction from above, the depression has a first substantially almond-shaped portion and a second substantially V-shaped portion, which first and second portions sufficiently overlap in the longitudinal direction in an overlap portion so that a coherent depression is formed, and wherein an open side of the V-shaped portion is located on the end of the cushioning body.

17. A cushioning body for a leg rest of a rollator walking aid, wherein the cushioning body is an elastic molded body attachable to a support member of the leg rest of the walking aid and comprises an upper side and a lower side, with the upper side facing and being in contact with a leg of a person when the person is using the walking aid, wherein at least one of the upper side and the lower side of the cushioning body has a depression, with the depression being configured as a recess or as an area in which material of the molded body has a lower density and with a protuberant part of the anterior surface of the knee and of the neighboring portion of the lower leg being received in the depression when the leg of the person is resting on the cushioning body, wherein a shape of the depression is symmetrical relative to a plane of symmetry extending at right angles relative to a surface of the upper side of the cushioning body, and wherein in a cut plane formed through the plane of symmetry, the depression has two deeper portions and a flatter portion therebetween, with a first deeper portion proceeding from a starting point on the upper side of the cushioning body, from which starting point the depth initially increases continuously, and with the second deeper portion extending up to the edge of the cushioning body.

18. The cushioning body of claim 17, wherein starting from the flatter portion, the depth of the second deeper portion initially continuously increases continuously and subsequently remains approximately constant up to the edge of the cushioning body.

19. The cushioning body of claim 17, wherein a maximum depth of the first and of the second deeper portion of the depression each measures 3-8 mm and a minimum depth of the flatter portion of the depression measures 2-4 mm.

20. The cushioning body of claim 17, wherein a maximum depth of the first and of the second deeper portion of the depression each measures 3-8 mm and a minimum depth of the flatter portion of the depression measures 2-4 mm.

\* \* \* \* \*